Figure 1:
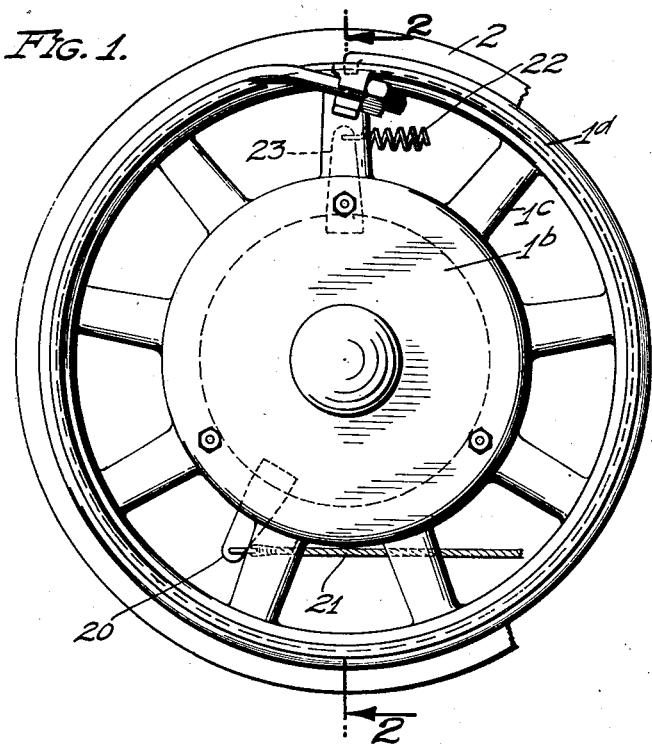

Feb. 23, 1932.　　　H. E. MARSH　　　1,846,886

HYDRAULIC BRAKE MECHANISM

Filed March 25, 1929　　2 Sheets-Sheet 1

INVENTOR.
HOWARD E. MARSH
BY A. B. Bowman
ATTORNEY

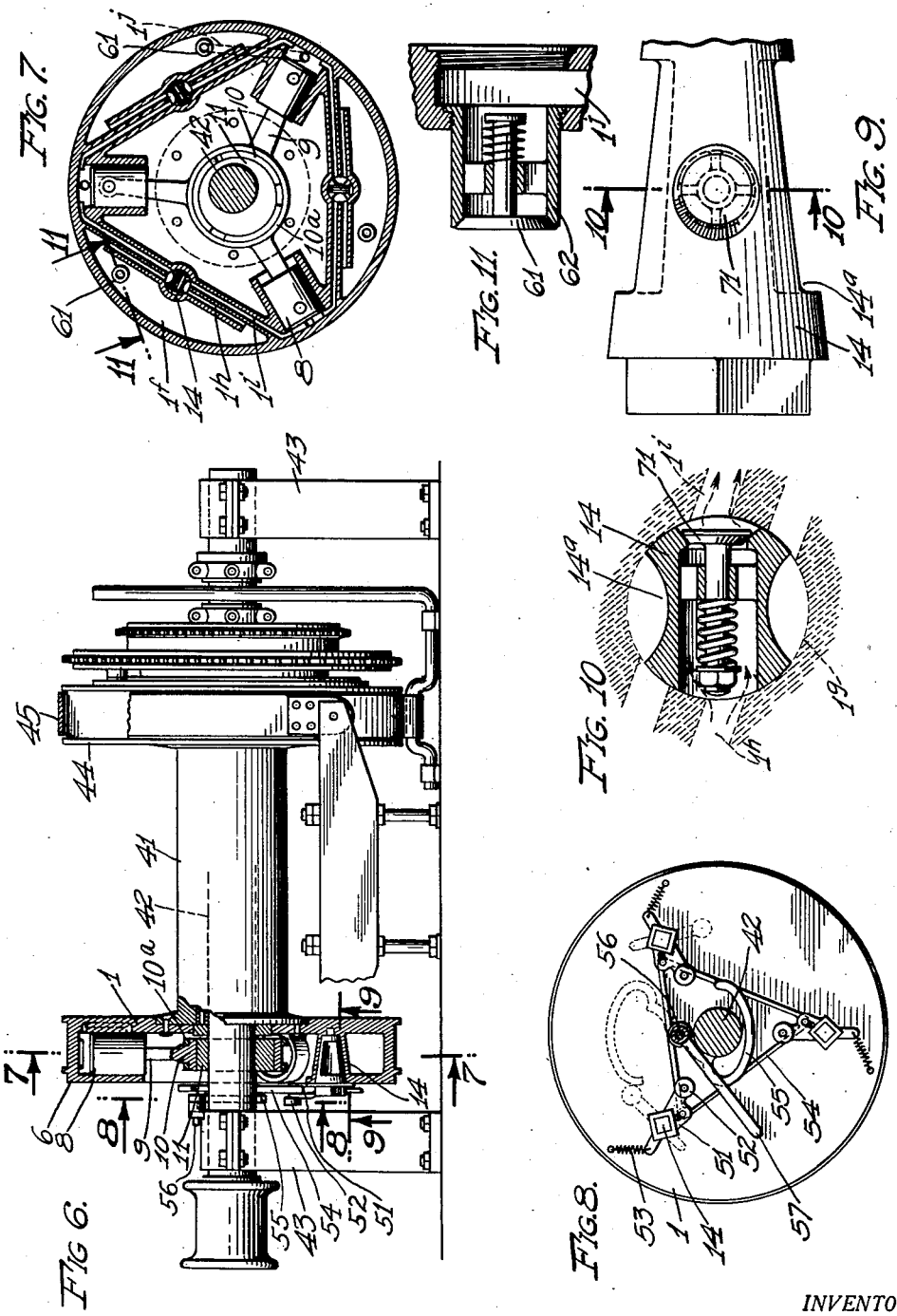

Patented Feb. 23, 1932

1,846,886

UNITED STATES PATENT OFFICE

HOWARD E. MARSH, OF LOMPOC, CALIFORNIA

HYDRAULIC BRAKE MECHANISM

Application filed March 25, 1929. Serial No. 349,625.

My present invention relates to a hydraulic brake mechanism and the objects of this invention are: first, to provide a brake mechanism of this class which may be used in substantially all places where the ordinary band brake, and also other brakes, are now used, and to provide one which is particularly applicable for use where the brakes are to be applied often; second, to provide a brake mechanism of this class whereby the brakes may be applied with no appreciable effort irrespective of the size of the brake mechanism or the size of the member or the load on the member to which the brakes are applied; third, to provide a brake mechanism of this class which requires no more exterior space than ordinary band or shoe brakes, and one in which substantially the whole braking mechanism is confined within the wheel or other revoluble member to which the brakes are adapted to be applied; fourth, to provide a mechanism of this class in which the hydraulic cylinders, the pistons, reservoirs, operating fluid, valves, and the like, are carried on the wheel or other revoluble member and confined therein, thus providing a very compact brake structure and one in which the added parts to the revoluble member add to the revolving momentum thereof; fifth, to provide a mechanism of this class in which the fluid reservoirs are so arranged in the revoluble member that the operating fluid is forced by centrifugal force toward the outer walls of the reservoirs, thus permitting the brakes to be operated with a minimum amount of fluid; sixth, to provide novelly arranged valve means whereby the hydraulic cylinders are filled at all times with the operating fluid so that no vacuum may be formed therein when the pistons within the cylinders are receding and thereby destroying the braking effect of the mechanism; seventh, to provide novel means for relieving the pressure within the hydraulic cylinders when the brakes are instantly applied, thus preventing the wheel or other revoluble member on which the brake mechanism is applied from becoming non-rotatably locked to the vehicle or other apparatus to which the wheel or removable member is connected, and for equalizing the brake application on the wheels of a vehicle or other apparatus if a multiplicity of such brake mechanisms are used thereon; eighth, to provide novel means for controlling the brakes in a mechanism of this class; ninth, to provide a novel vehicle wheel in which my brake mechanism is embodied; and, tenth, to provide as a whole a novelly constructed brake mechanism of this class and one which is simple and economical of construction and one which will not readily get out of order.

Figure 2:
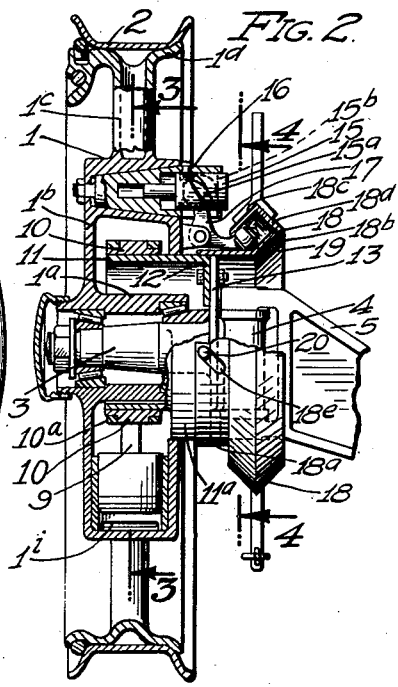
Figure 4:
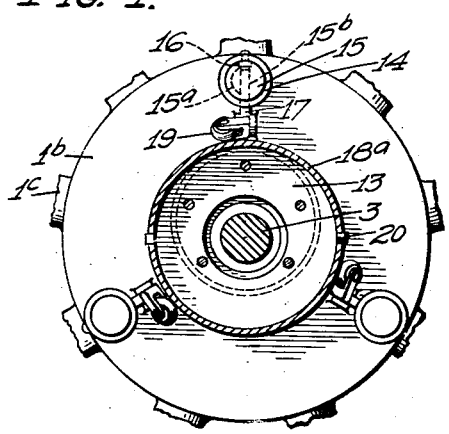
Figure 3:
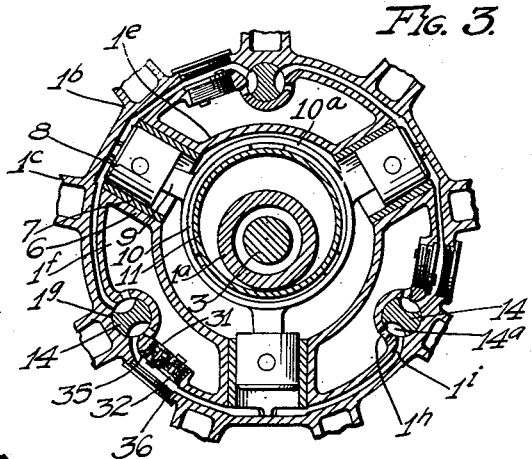
Figures 5, 12:
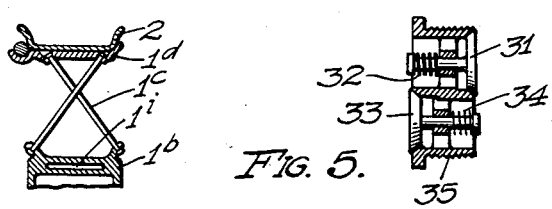

With these and other objects in view, as will appear hereinafter, my invention consists of certain novel features of construction, combination and arrangement of parts and portions, as will be hereinafter described in detail and particularly set forth in the appended claims, reference being had to the accompanying drawings and to the characters of reference thereon which form a part of this application in which:

Figure 1 is an outer side view of a vehicle wheel embodying my invention and showing fragmentarily a tire rim mounted thereon; Fig. 2 is a fragmentary sectional view thereof taken through 2—2 of Fig. 1; Fig. 3 is a fragmentary transverse sectional view thereof taken through 3—3 of Fig. 2; Fig. 4 is another transverse sectional view thereof taken through 4—4 of Fig. 2; Fig. 5 is an enlarged sectional view of the auxiliary valve mechanism for continuously supplying the cylinders with fluid and also for relieving the pressure therein; Fig. 6 is a partial side elevational and partial sectional view of my hydraulic brake mechanism applied to a draw works for oil wells; Fig. 7 is a sectional view thereof taken through 7—7 of Fig. 6; Fig. 8 is a sectional view thereof taken through 8—8 of Fig. 6; Fig. 9 is an enlarged fragmentary side view of the valve for controlling the flow of fluid between the reservoir means and the cylinders; Fig. 10 is a transverse sectional view thereof taken through 10—10 of Fig. 9, and showing its relation to the ports in the revoluble member, the latter being shown fragmentarily and by dotted lines; Fig. 11 is an enlarged sectional view taken through 11—11 of Fig. 7 showing the pressure relief valve from one of the cylinders; and Fig. 12 is a fragmentary section of a modification of the vehicle wheel.

Like characters of reference refer to similar parts and portions throughout the views of the drawings.

The vehicle wheel shown in Figs. 1, 2, 3 and 4, and designated 1, therein, is preferably cast as an integral unit. This wheel consists of a hub portion 1a, a drum 1b secured to and positioned around the hub portion, spokes 1c, radiating outwardly from the drum, and a felly 1d secured to and cast integrally with the spokes.

The tire rim, designated 2, is mounted on the felly and may be secured in position thereon in any suitable manner.

The wheel here is shown mounted on a spindle 3 extending outwardly from a steering knuckle 4 of a front axle 5 on which the steering knuckle is mounted on a vertical axis in the usual manner. It will be here noted that the wheel is also adapted to be mounted on a rear axle with equal facility.

In the drum 1b are provided a multiplicity of cylinders 6, in this instance there being three of such cylinders. In these cylinders are driven cylinder sleeves 7 which will be hereinafter referred to as cylinders. In each of the cylinders is reciprocally mounted a piston 8 which is pivotally connected to an arm 9, there being provided three of such arms. These arms are secured at their inner ends to arcuate eccentric shoes 10 which are positioned with their arcuate sides against and rotatably mounted on an eccentric drum 11 which is provided at its inner end with a head 12. The shoes are held in position by continuous rings 10a positioned in grooves at the edges of the shoes. This head is secured to the outer side of a flange 13 which extends radially from the inner end of the spindle and is secured thereto. The eccentric drum 11 is positioned eccentrically with respect to the axis of the spindle 3 but is provided at its inner end with a bearing portion 11a which is concentric with respect to the axis of the spindle 3. The inner side of the drum 1b extends to this bearing portion A and is adapted to seal the interior of the drum 1b.

The drum 1b of the wheel is provided with an inner wall 1e which connects the inner ends of the cylinders and forms the inner walls of three fluid reservoirs 1f, each of the reservoirs extending between the wall 1e and the outer wall of the drum 1b and between the adjacent cylinders. In these reservoirs is confined the operating fluid for the brake mechanism which in this instance is preferably oil.

In these reservoirs are valve chamber 1g in which are positioned and rotatably mounted plug valves 14 which are preferably tapered inwardly from the inner side of the drum 1b. The valve chambers 1g communicate at their opposite sides with the reservoirs through long slots 1h and also outwardly from the slots 1h through passages 1i with the outer ends of the cylinders, these passages 1i being wide passages, as shown best in Fig. 2, and positioned within or near the outer wall of the drum 1b. In the opposite sides of the flood valves 14 are provided longitudinal grooves 14a, as shown best in Fig. 9 and 10. Each of these grooves is adapted to connect a pair of slots or passages 1h and 1i, as shown best in Fig. 3, when it is intended to permit the wheel to rotate freely about its axis and about the eccentric drum, but when the valves are rotated so as to close off the passage 1i from free communication with the reservoir, the wheel is prevented from rotating, except as will be hereinafter more specifically set forth, the rotation being prevented by the substantial non-compressibility of the oil and the consequent prevention of reciprocation of the pistons and the non-rotation of the eccentric stop about the eccentric drum. The slots or passages 1h are preferably arranged near the outer wall of the reservoir so that under ordinary circumstances, when the wheel is rotating, sufficient oil will be supplied to the cylinders for the braking operation.

The valves 14 are rotated by cam members 15 which consist of cylindrical members having, in their exterior helical cam slots 15a. These cam members are reciprocally mounted in cylindrical recesses at the outer ends of the valves 14. Through the wall, forming the cylindrical recess of each valve, extends a pin 16 which pin extends into the helical cam slot 15a. At the inner end of the pin 16 is preferably placed a roller to facilitate the sliding of the pin or roller through the cam slot. The cam member 15 is prevented from rotating relative to the wheel, but is shifted inwardly and outwardly with respect thereto by a bellcrank lever 17 which is pivotally mounted on the inner side of the wheel, as shown in Figs. 2 and 4. One of the arms of each bellcrank extends radially from the axis of the wheel into a transverse slot 15b of the cam member for shifting the same. As the cam members are shifted inwardly, the pin 16 passes through the helical cam groove forcing the valve 14 to rotate in one direction for shutting off the valve, and when the cam members are withdrawn, the valves are rotated in the opposite direction.

The other arms of the bellcranks extend inwardly from the wheel and are adapted to be shifted radially outwardly or inwardly with respect to the axis of the wheel by a special cone member 18 whereby positive shifting action of the bellcranks 17 and of the valves is attained. This cone member is provided with a drum portion 18a which is rotatably and longitudinally shiftably mounted on the bearing portion 11a of the eccentric drum. At the outer end of the drum portion 18a, that is, the portion remote from the wheel, is an outwardly diverging cone portion 18b. Spaced from the cone portion 18b and in parallel relation thereto is another cone portion 18c. These two cone portions are connected at their outer edges by an annular connecting portion 18d. The adjacent sides of the cone portions 18b and 18c form an inclined annular track in which are adapted to ride rollers 19 which are revolubly mounted at the last mentioned ends of the bellcrank levers. As the cone member 18 is forced inwardly, the rollers 19 are forced into the track between the cones and forced outwardly with respect to the axis of the wheel, rotating the bellcranks about their pivotal axes and rotating the valves, as described above.

The cone member 18 is forced inwardly, as the same is rotated, by a pin or pins 20 projecting outwardly from the bearing portion 11a into a diagonal slot or diagonal slots 18e in the drum portion of the cone member 18, as shown best in Fig. 2. The cone member is rotated by an arm 20 extending outwardly therefrom, said arm being connected by a cable 21 or other suitable means to suitable levers or pedals. The cone member is retained in a neutral position by a spring 22 which is connected at one end to the vehicle frame, not shown, and at its opposite end to another arm 23 secured to the cone member 18, as shown in Fig. 1.

In order to prevent sudden shock upon the vehicle or other machinery to which the brake mechanism is connected, I have provided a pressure relief valve 31 in a passage which connects the cylinders to the reservoirs, there being provided at least one of such valves for each cylinder. Since the passage 1i is convenient for this purpose, I have provided such pressure relief valve in this passage which permits the fluid under pressure to be discharged past the valve 31 to the reservoir. The spring 32 which seats the valve is preferably under such compression that the valve 31 will not be opened until the desired resistance is effected between the wheel and the eccentric means.

In order to prevent a vacuum being formed in any of the cylinders or to prevent such possible vacuum from being filled with air by reason of leaks past the pistons, I have provided a fluid supply valve 33 for each of the cylinders and I have provided such supply valve in the passage 1i. This valve is normally seated by a spring 34 under slight compression.

If desired the two valves just referred to may be mounted in the same cage 35 and secured in the wall separating the passage 1i from the reservoir, as shown in Fig. 3. This cage may be inserted through the wall between the passage 1i and the outer wall of the drum and the hole provided for this purpose may be sealed by a plug 36, as shown in Fig. 3.

The operation of the brake mechanism embodied in the structure shown in Figs. 6 to 11, inclusive, is substantially the same as that described above in connection with the vehicle wheel, except for the features as will be more specifically set out hereafter. The apparatus shown in Fig. 6 is a draw works or hoist which, for the purposes herein, consists essentially of a spool or drum 41 which is revolubly mounted on a shaft 42 mounted on brackets 43. On one end of the spool is a large drum 44 around which is positioned an emergency brake band 45. On the opposite end of the spool is a casting 1 in the form of a drum similar in construction to the drum described in connection with the wheel 1. The eccentric 11 in this instance is secured to the shaft 42. The cylinders 6, pistons 8, eccentric rods or arms 9, eccentric bands 10 and the valves 14 are arranged in a manner similar to that described in connection with the vehicle wheel. In this construction, however, the valves 14 are arranged at the inner sides of the reservoirs 1f to bring the same inwardly toward the axis of the revoluble member 1. In this construction also the passage 1i is arranged along the inner wall of the reservoir and the passage 1h is arranged outwardly therefrom and terminates near the outer portion of the reservoir so that the oil in the reservoir will be forced readily into the passage 1h, as shown in Fig. 7.

In this construction, the valves are rotated by valve arms 51 which are secured to the outer ends of the valves and which are provided at their inner ends with rollers 52 and which are held in open or neutral positions by springs 53 secured to the outer ends of the arms and to the revoluble member 1. The several arms 51 are preferably moved or shifted in unison and are connected by members 54. The rollers are adapted to be engaged and shifted by a cam segment 55 which is pivotally mounted at one side of the axis of the shaft 42 by a bolt 56 on one of the brackets 43. This cam segment is shifted by a lever 57, as shown by dotted lines in Fig. 8. When so shifted to the extreme position or intermediate positions, the rollers consecutively engage the cam segment and close the valves.

In this construction, I have provided the pressure relief valves designated 61, in the lateral side walls of the revoluble member 1, as shown in Fig. 7. These pressure relief valves communicate with the outer ends of the cylinders by means of passages 1j. The pressure relief valve is more specifically shown on an enlarged scale in Fig. 11 and is shown mounted in a cage 62 secured in the side walls of the reservoir through the outer side wall of the revoluble member. The auxiliary supply valve, designated 71, for continuously supplying oil to the cylinders when the same are receding and when the valves 14 are shut off, are in this instance mounted in the valves 14 transversely to the axis of the valves 14 and between the longitudinal grooves 14a at the opposite sides thereof. The valve 14 is shown in Fig. 10 shifted to its closed position with respect to the passages 1h and 1i which are shown by dotted lines; the arrows shown by dotted lines indicate the passage of oil from one of the passages 1h, at the opposite side of the valve chamber 1g from the passage 1i, through the transverse passage in the valve 14 to the passage 1i from which latter passage the oil is conducted into the cylinder to prevent vacuum from being created therein.

The operation of the brake mechanism is the same as that described above in connection with the vehicle wheel.

Though I have shown and described a particular construction, combination and arrangement of parts and portions of my hydraulic brake mechanism, and a certain modification thereof, and specific applications of my brake mechanisms, I do not wish to be limited to this particular construction, combination and arrangement, nor to the modification, nor to the specific applications, but desire to include in the scope of my invention the construction, combination and arrangement substantially as set forth in the appended claims.

Having thus described my invention, what I claim as new and desire to secure by Letters Patent is:

1. In a mechanism of the class described, a revoluble member, a multiplicity of cylinders mounted on the revoluble member on radii extending from the axis of rotation of the revoluble member, an eccentric mounted revolubly with respect to the revoluble member, eccentric shoes mounted in operative relation with the eccentric, said shoes being provided with arms radiating therefrom, and pistons reciprocally mounted in the cylinders, one of the pistons connected to each of the arms, said revoluble member having reservoirs near its outer portion and between the cylinders, said revoluble member being also provided with ports connecting the reservoirs to the outer ends of the cylinders.

2. In a mechanism of the class described, a revoluble member, a multiplicity of cylinders mounted on the revoluble member on radii extending from the axis of rotation of the revoluble member, an eccentric mounted revolubly with respect to the revoluble member, eccentric shoes mounted in operative relation with the eccentric, said shoes being provided with arms radiating therefrom, pistons reciprocally mounted in the cylinders, one of the pistons connected to each of the arms, said revoluble member having reservoirs near its outer portions, and valves mounted in the revoluble member for controlling the flow of fluid from and to the reservoirs, the outer ends of each of the cylinders being connected to the valves.

3. In a mechanism of the class described, a revoluble member, a multiplicity of cylinders mounted on the revoluble member on radii extending from the axis of rotation of the revoluble member, an eccentric mounted revolubly with respect to the revoluble member, eccentric shoes mounted in operative relation with the eccentric, said shoes being provided with arms radiating therefrom, pistons reciprocally mounted in the cylinders, one of the pistons connected to each of the arms, said revoluble member having reservoirs near its outer portions, valves mounted in the revoluble member for controlling the flow of fluid from and to the reservoirs, the outer ends of each of the cylinders being connected to the valves, means rotatable with the revoluble member for actuating the valves, and manual means revoluble with respect to the eccentric and operatively connected to the last mentioned means for controlling the same and actuating the valves.

4. In a mechanism of the class described, a revoluble member having a multiplicity of cylinders therein, a stationary eccentric at the central portion of the revoluble member, eccentric shoes mounted around the eccentric, and having outwardly extending arms, pistons reciprocally mounted in the cylinders and connected to the arms, said revoluble member having reservoir means, and valves connecting the reservoir means to the outer ends of the cylinders.

5. In a mechanism of the class described, a revoluble member having a multiplicity of cylinders, therein, pistons reciprocally mounted in the cylinders, fixed means at the central portion of the revoluble member for reciprocating the pistons when the revoluble member is rotated, reservoir means carried by the revoluble member and connected to the outer ends of the cylinders, and valves for controlling the flow of fluid between the reservoir means and the outer ends of the cylinders.

6. In a mechanism of the class described, a stationary support, a wheel member revoluble thereon, cylinders in the wheel member on radii extending from the axis of the wheel member, eccentric means fixed to the support, pistons reciprocally mounted in the cylinders and connected to the eccentric means, said wheel member having reservoirs at the outer portions thereof between the cylinders, valves at the outer portions of the wheel member for controlling the flow of fluid from the reservoirs to the outer ends of the cylinders, said valves extending to one side of the wheel member, and means mounted on the support for rotating the valves.

7. In a mechanism of the class described, a support, a wheel member revoluble thereon, cylinders in the wheel member on radii extending from the axis of the wheel member, eccentric means fixed to the support, pistons reciprocally mounted in the cylinders and connected to the eccentric means, said wheel member having reservoirs at the outer portions thereof between the cylinders, valves at the outer portions of the wheel member for controlling the flow of fluid from the reservoirs to the outer ends of the cylinders, said valves extending to one side of the wheel member, and manual brake control means rotatably and longitudinally shiftably mounted with respect to the eccentric means and operatively connected to the valves for rotating the same.

8. In a mechanism of the class described, a support, a wheel member revoluble thereon, cylinders in the wheel member on radii extending from the axis of the wheel member, eccentric means fixed to the support, pistons reciprocally mounted in the cylinders and connected to the eccentric means, said wheel member having reservoirs at the outer portions thereof between the cylinders, valves at the outer portions of the wheel member for controlling the flow of fluid from the reservoirs to the outer ends of the cylinders, said valves extending to one side of the wheel member, manual brake control means rotatably and longitudinally shiftably mounted with respect to the eccentric means, and lever means mounted on the wheel member and connected at one end to the valves and adapted to be engaged at the other end by the manual means.

9. In a mechanism of the class described, a support, a wheel member revoluble thereon, cylinders in the wheel member on radii extending from the axis of the wheel member, eccentric means fixed to the support, pistons reciprocally mounted in the cylinders and connected to the eccentric means, said wheel member having reservoirs at the outer portions thereof between the cylinders, valves at the outer portions of the wheel member for controlling the flow of fluid from the reservoirs to the outer ends of the cylinders, said valves extending to one side of the wheel member, manual brake control means rotatably and longitudinally shiftably mounted with respect to the eccentric means, helical cam means reciprocally mounted in each of the valves and rotatable relative thereto, said cam means being revoluble with the wheel member and non-rotatable with respect thereto, and bell-crank levers mounted on the wheel member, each lever having one arm connected to one of the cam means and the other arm adapted to be engaged by the manual means for controlling the valves.

10. In a mechanism of the class described, a revoluble member having a multiplicity of cylinders therein and having at its peripheral portion fluid reservoir means and ports connecting the outer portion of the reservoir means to the cylinders, pistons in the cylinders, stationary means at the central portion of the revoluble member to facilitate the reciprocation of the pistons, and manually controlled valves for controlling the flow of fluid between the reservoir means and the cylinders.

11. In a mechanism of the class described, a revoluble member having a multiplicity of cylinders therein and reservoir means therein communicating with the outer ends of the cylinders, valves mounted in the revoluble members for controlling the flow of fluid between the reservoir means and the cylinders, levers mounted on the revoluble member for shifting the valves and provided at their outer ends with rollers, and oppositely disposed cones positioned in spaced relation to each other forming an inclined annular channel for receiving the rollers, said cones being shiftable in unison toward and from the revoluble member for shifting said rollers to and from said channel for tilting the levers whereby the valves are shifted.

12. In a mechanism of the class described, a revoluble member having a multiplicity of cylinders therein, pistons reciprocally mounted in the cylinders, means at the central portion of the revoluble member for reciprocating the pistons when the revoluble member is rotated, reservoir means carried by the revoluble member and connected to the outer ends of the cylinders, valves for controlling the flow of fluid between the reservoir means and the outer ends of the cylinders, and pressure valves in connection with the reservoir means for permitting at all times fluid to flow from the reservoir means into the cylinders.

13. In a mechanism of the class described, a revoluble member having a multiplicity of cylinders therein, pistons reciprocally mounted in the cylinders, means at the central portion of the revoluble member for reciprocating the pistons when the revoluble member is rotated, reservoir means carried by the revoluble member and connected to the outer ends of the cylinders, valves for controlling the flow of fluid between the reservoir means and the outer ends of the cylinders, pressure valves in connection with the reservoir means for permitting at all times fluid to flow from the reservoir means into the cylinders, and pressure relief valves for relieving excessive pressures in the cylinders and for discharging fluid therein into the reservoir means.

14. In a mechanism of the class described, a revoluble member having a multiplicity of cylinders therein, pistons reciprocally mounted in the cylinders, means at the central portion of the revoluble member for reciprocating the pistons when the revoluble member is rotated relative thereto, reservoir means carried by the revoluble member and connected to the outer ends of the cylinders, valves at the outer portions of the revoluble member for controlling the flow of fluid from the reservoir means to the outer ends of the cylinders, said valves extending to one side of the revoluble member, manual brake control means rotatably and longitudinally shiftably mounted and positioned coaxial with the revoluble member, helical cam means reciprocally mounted on each of the valves and rotatable relative thereto, said cam means being revoluble with the revoluble member and non-rotatable with respect thereto, and bell crank levers mounted on the revoluble member, each lever having one arm connected to one of the cam means and the other arm adapted to be engaged by the manual means for controlling the valves.

15. In a mechanism of the class described, a revoluble member having a multiplicity of cylinders therein and having at its peripheral portion between the cylinders fluid reservoirs and also having fluid passages connecting each of the reservoirs with two adjacent cylinders, whereby each reservoir supplies two cylinders and each cylinder is supplied by two reservoirs, valves controlling the flow of fluid between the reservoirs and the passages, pistons in the cylinders, means at the central portion of the revoluble member to facilitate the reciprocation of the pistons, and means for controlling the valves.

16. In a mechanism of the class described, a revoluble member having a multiplicity of cylinders therein and having at its peripheral portion between the cylinders fluid reservoirs and also having fluid passages connecting each of the reservoirs with two adjacent cylinders, whereby each reservoir supplies two cylinders and each cylinder is supplied by two reservoirs, valves controlling the flow of fluid between the reservoirs and the passages, there being provided one valve member for each of the reservoirs for controlling the flow to and from the passages connected to said one reservoir, pistons in the cylinders, means at the central portion of the revoluble member to facilitate the reciprocation of the pistons, and means for simultaneously controlling all of said valves.

17. In a mechanism of the class described, a revoluble member having a multiplicity of cylinders therein, a stationary eccentric at the central portion of the revoluble member, eccentric shoes mounted around the eccentric, said shoes having outwardly extending arms, pistons reciprocally mounted in the cylinders and connected to the arms, reservoir means, and valves connecting the reservoir means to the outer ends of the cylinders.

18. In a mechanism of the class described, a revoluble member having a multiplicity of cylinders therein, pistons reciprocally mounted in the cylinders, fixed means at the central portion of the revoluble member for reciprocating the pistons when the revoluble member is rotated, reservoir means connected to the outer ends of the cylinders, and valves for controlling the flow of fluid between the reservoir means and the outer ends of the cylinders.

In testimony whereof I have hereunto set my hand at Los Angeles, Calif., this 18th day of March, 1929.

HOWARD E. MARSH.